United States Patent
Yang

(10) Patent No.: US 8,451,169 B2
(45) Date of Patent: May 28, 2013

(54) METHOD AND APPARATUS OF CORRECTING CLOCK DRIFT ERROR

(75) Inventor: Shi-Xian Yang, Tainan (TW)

(73) Assignee: SkyTraq Technology, Inc., East District, Hsinchu (TW)

( * ) Notice: Subject to any disclaimer, the term of this patent is extended or adjusted under 35 U.S.C. 154(b) by 245 days.

(21) Appl. No.: 13/157,409

(22) Filed: Jun. 10, 2011

(65) Prior Publication Data

US 2012/0313815 A1 Dec. 13, 2012

(51) Int. Cl.
*G01S 19/23* (2010.01)

(52) U.S. Cl.
USPC .................................................. 342/357.62

(58) Field of Classification Search
USPC .................................................. 342/357.62
See application file for complete search history.

(56) References Cited

U.S. PATENT DOCUMENTS

| | | | |
|---|---|---|---|
| 5,600,670 A * | 2/1997 | Turney | 375/150 |
| 5,629,708 A | 5/1997 | Rodal et al. | |
| 5,654,718 A | 8/1997 | Beason et al. | |
| 5,854,605 A | 12/1998 | Gildea | |
| 6,331,836 B1 | 12/2001 | Jandrell | |
| 6,498,585 B2 | 12/2002 | Jandrell | |
| 6,509,870 B1 | 1/2003 | Matsushita et al. | |
| 6,650,285 B2 | 11/2003 | Jandrell | |
| 6,697,016 B1 | 2/2004 | Voor et al. | |
| 7,224,950 B2 | 5/2007 | McBurney | |
| 7,375,681 B1 | 5/2008 | Woo | |
| 7,388,541 B1 | 6/2008 | Yang | |
| 7,459,984 B2 | 12/2008 | Wang et al. | |
| 7,586,382 B2 | 9/2009 | Wang et al. | |
| 7,773,034 B2 | 8/2010 | Levy | |
| 7,928,811 B2 * | 4/2011 | Brodie | 331/158 |
| 2003/0210713 A1 | 11/2003 | Abdel-Ghaffar | |
| 2004/0209626 A1 * | 10/2004 | Fitzrandolph | 455/456.1 |
| 2005/0024263 A1 | 2/2005 | Sharpe et al. | |
| 2008/0158050 A1 | 7/2008 | Levy | |
| 2008/0198070 A1 | 8/2008 | Wang et al. | |
| 2009/0153398 A1 | 6/2009 | Hani et al. | |
| 2009/0278735 A1 | 11/2009 | Jin et al. | |
| 2010/0141522 A1 | 6/2010 | Tsai | |
| 2010/0158181 A1 | 6/2010 | Hadzic | |
| 2010/0278055 A1 | 11/2010 | Barry et al. | |
| 2010/0283682 A1 | 11/2010 | Heidari-Bateni et al. | |
| 2010/0295623 A1 | 11/2010 | Gronemeyer | |
| 2011/0037652 A1 | 2/2011 | Stafford | |

FOREIGN PATENT DOCUMENTS

| | | |
|---|---|---|
| EP | 1 336 859 | 1/2004 |
| WO | WO-02/16961 | 2/2002 |
| WO | WO-2004/031796 | 4/2004 |
| WO | WO-2008/082832 | 7/2008 |

* cited by examiner

*Primary Examiner* — Harry Liu
(74) *Attorney, Agent, or Firm* — Winston Hsu; Scott Margo

(57) ABSTRACT

In an apparatus of correcting a clock drift error, a receiver unit receives a first GNSS signal from a satellite. A Doppler correction unit obtains a first predicted frequency. A tracking unit can obtain a first tracked frequency. The satellite-positioning unit determines a clock offset based on a position fix. A computation unit calculates a first difference between the first predicted and tracked frequencies. When the receiver unit is turned off and then on for receiving a second GNSS signal from the satellite, the Doppler correction unit obtains a second predicted frequency, the tracking unit obtains a second tracked frequency, and the computation unit calculates a second difference between the second predicted and tracked frequencies. An error correction unit computes an estimated clock offset according to the clock offset, the first difference, and the second difference.

20 Claims, 2 Drawing Sheets

METHOD AND APPARATUS OF CORRECTING CLOCK DRIFT ERROR

BACKGROUND OF INVENTION

The present disclosure relates to GNSS applications, and more particularly, methods and apparatuses of correcting a clock drift error.

The Global Positioning System (GPS) is a space-based global navigation satellite system (GNSS) that provides reliable location and time information in all weather and at all times and anywhere on or near the Earth when and where there is an unobstructed line of sight to four or more GPS satellites.

The satellites of the Global Positioning System (GPS) broadcast radio signals to enable GPS receivers on or near the Earth's surface to determine location and synchronized time. The GPS system itself is operated by the U.S. Department of Defense for both military use and use by the general public.

GPS signals include ranging signals, used to measure the distance to the satellite, and navigation messages. The navigation messages include ephemeris data, used to calculate the position of each satellite in orbit, and information about the time and status of the entire satellite constellation, called the almanac.

BRIEF SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one or more various aspects, the present disclosure is directed to navigation satellite receivers, methods and apparatuses of correcting a clock drift error.

According to one embodiment of the present invention, an apparatus of correcting a clock drift error includes a receiver unit, a Doppler correction unit, a tracking unit, a satellite-positioning unit, a computation unit, a storage unit and an error correction unit. The receiver unit can receive a first GNSS signal from a satellite. The Doppler correction unit can obtain a first predicted frequency by performing Doppler correction to the first GNSS signal based on Doppler information derived from the first GNSS signal. The tracking unit can process the first GNSS signal to obtain a first tracked frequency of the satellite. The satellite-positioning unit can perform a position fix and determine a clock offset based on the position fix. The computation unit can calculate a first difference between the first predicted frequency and the first tracked frequency. The storage unit can store the clock offset with the first difference. When the receiver unit is turned off and then turned on for receiving a second GNSS signal from the satellite, the Doppler correction unit obtains a second predicted frequency, the tracking unit obtains a second tracked frequency of the satellite, and the computation unit calculates a second difference between the second predicted frequency and the second tracked frequency. The error correction unit can compute an estimated clock offset according to the clock offset, the first difference, and the second difference.

Accordingly, the apparatus can calculate the estimated clock offset beforehand by only one satellite, without utilizing any temperature sensor for temperature compensation on the clock offset stored in the storage unit. In use, the error correction unit gets the estimated clock offset before the satellite-positioning unit performs the new position fix again.

According to another embodiment of the present invention, a method of correcting a clock drift error includes steps as follows. (a) A first GNSS signal is received from a satellite by using a receiver unit. (b) A first predicted frequency is obtained by performing Doppler correction to the first GNSS signal based on Doppler information derived from the first GNSS signal. (c) The first GNSS signal is processed to obtain a first tracked frequency of the satellite. (d) A position fix is performed and a clock offset based on the position fix is determined. (e) A first difference between the first predicted frequency and the first tracked frequency is calculated. (f) The clock offset with the first difference is stored. When the receiver unit is turned off and then turned on for receiving a second GNSS signal from the satellite, the step (b) is performed anew to obtain a second predicted frequency, the step (c) is performed anew to obtain a second tracked frequency of the first satellite, and step (d) is performed anew to calculate a second difference between the second predicted frequency and the second tracked frequency. (g) An estimated clock offset is computed according to the clock offset, the first difference, and the second difference.

Accordingly, the method can be performed to calculate the estimated clock offset beforehand by only one satellite, without utilizing any temperature sensor for temperature compensation on the stored clock offset. In operation, step (g) is performed to get the estimated clock offset before the step (d) is performed again.

Many of the attendant features will be more readily appreciated, as the same becomes better understood by reference to the following detailed description considered in connection with the accompanying drawings.

BRIEF DESCRIPTION OF DRAWINGS

The present description will be better understood from the following detailed description read in light of the accompanying drawing, wherein.

DETAILED DISCLOSURE

Figure 1:
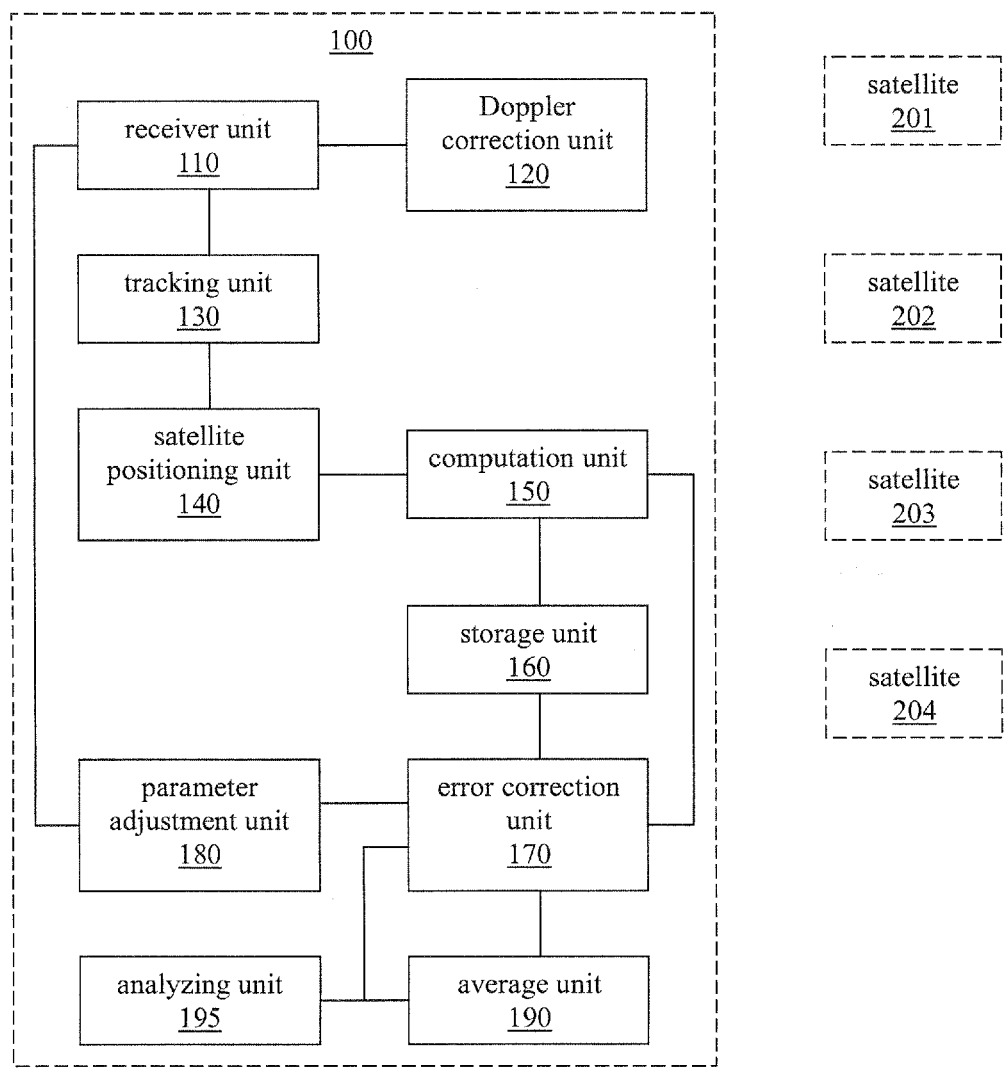
FIG. 1 is a block diagram of an apparatus for correcting a clock drift error according to one embodiment of the present disclosure.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Global Navigation Satellite System (GNSS) may be the Global Positioning System (GPS), Global Navigation Satellite System (GLONASS), GALILEO, COMPASS Navigation Satellite System (CNSS) and/or the like. The following disclosure uses GPS as an illustrative system, and those skilled in the art will be able to practice the application in conjunction with other satellite systems.

An apparatus 100 of correcting a clock drift error is shown in FIG. 1. The apparatus 100 may be easily inserted into a conventional or future-developed navigation satellite receiver, and may be applicable or readily adaptable to all technology.

As shown in FIG. 1, the apparatus 100 at least includes a receiver unit 110, a Doppler correction unit 120, a tracking unit 130, and a satellite-positioning unit 140.

In use, the receiver unit 110 can receive GNSS signals from satellites of the Global Positioning System, respectively. In this embodiment, the receiver unit 110 receives a first GNSS signal from the satellite 201. For the ranging codes and navigation message of the first GNSS signal to travel from the satellite 201 to the receiver unit 110, they must be modulated onto a carrier frequency. For example, in the case of the original GPS design, the first GPS signals, broadcast on the L1 frequency (1575.42 MHz), which currently contains the C/A signal used by all current GPS users.

However, because of the Doppler effect, the carrier frequency of the first GNSS signal being transmitted drifted as the satellite approached. Therefore, the Doppler correction unit 120 can obtain a first predicted frequency of the satellite 201 by performing Doppler correction to the first GNSS signal based on Doppler information derived from the first GNSS signal. The first predicted frequency (f1) satisfies the following relationship:

$$f1 = \frac{\Delta(V_S - V_R)}{\sqrt{d^2}} \times \frac{GNSS \text{ broadcast frequency}}{C}$$

where $V_S$ represents the speed of the satellite, $V_R$ represents the speed of the receiver unit 110, d represents the distance between the satellite and the receiver unit 110, and C represents the velocity of light. For example, the GNSS broadcast frequency may be the L1 frequency (1575.42 MHz) or the like.

Moreover, the tracking unit 130 can process the first GNSS signal to obtain a first tracked frequency of the satellite 201 based on the processed first GNSS signal. The first tracked frequency is more accurate than the first predicted frequency because the first predicted frequency is deduced from the Doppler shift. In one embodiment, the tracking unit 130 may include one or more phase-locked loops that demodulates and decodes the first GNSS signal to obtain the first tracked frequency based on the demodulated and decoded first GNSS signal.

The satellite-positioning unit 140 can perform a position fix and determine a clock offset based on the position fix. The clock offset exists between a local clock of the apparatus 100 and an atomic clock of the satellite. The clock offset can be affected adversely by environmental parameters, such as the temperature of the apparatus 100.

For a more complete understanding of the position fix, please refer to the following examples. When the receiver unit 110 not only receives the first GNSS signal from the satellite 201 but also receives another three first GNSS signals, respectively, from another three satellites 202-204, the tracking unit 130 further processes these three first GNSS signal, so that the satellite-positioning unit 140 performs the position fix based on the four processed first GNSS signals corresponding to the four satellites 201-204.

In above embodiment, the receiver unit 110 can receive one or more respective first GNSS signals. When the receiver unit 110 is turned off and then after an elapsed period turned back on, the receiver unit 110 may receive four second GNSS signals corresponding to the four satellites 201-204, the tracking unit 130 may process these four second GNSS signals, so that the satellite-positioning unit 140 performs a new position fix based on the four processed second GNSS signals and determine a new clock offset based on this new position fix. In this way, however, it wastes a lot of time to get the new clock offset.

For quickly calculating an estimated clock offset when the receiver unit 110 is turned off and then turned on, the apparatus 100 also includes a computation unit 150, a storage unit 160 and an error correction unit 170.

In use, the computation unit 150 can calculate a first difference between the first predicted frequency and the first tracked frequency; for example, the first predicted frequency minus the first tracked frequency leaves the first difference. The storage unit 160 can store the clock offset and the first difference of each tracked satellite. For example, the storage unit 160 may be a non-volatile memory device that can retain the stored information of the clock offset with the first difference even when not powered.

When the receiver unit 110 is turned off and then turned on for receiving a second GNSS signal from the satellite 201, the Doppler correction unit 120 obtains a second predicted frequency, the tracking unit 130 obtains a second tracked frequency of the satellite 201, and the computation unit 150 calculates a second difference between the second predicted frequency and the second tracked frequency; in one embodiment, the second predicted frequency minus the second tracked frequency leaves the second difference. The error correction unit 170 can get the clock offset and the first difference from the storage unit 160, and compute an estimated clock offset according to the clock offset, the first difference, and the second difference. Specifically, in a preferable embodiment, the error correction unit 170 can subtract the first difference from the second difference to obtain a third difference, and further add the third difference and the clock offset together to get an estimated clock offset.

Accordingly, the apparatus 100 can calculate the estimated clock offset beforehand by only one satellite 201, without utilizing any temperature sensor for temperature compensation on the clock offset stored in the storage unit 160. In use, the error correction unit 170 gets the estimated clock offset before the satellite-positioning unit 140 performs the new position fix again without utilizing any additional hardware for compensation on the clock offset stored in the storage unit. The estimated clock offset may be more or less the same as a real clock offset that is determined by the satellite-positioning unit 140. In practice, if the receiver unit 110 were not moved, the estimated clock offset would be substantially equal to the real clock offset. Thus, the clock drift error can be corrected quickly by using the apparatus 100.

Furthermore, the apparatus 100 may includes a parameter adjustment unit 180. The parameter adjustment unit 180 can adjust a search range of the receiver unit 110 according to the estimated clock offset, so as to reduce search time for a weak GNSS signal. The signal strength of the weak GNSS signal ranges form about −160 dBm to −145 dBm; the signal strength of a normal GNSS signal is about −130 dBm.

In above embodiment, the receiver unit 110 receives the first GNSS signal from the satellite 201 first, and then the receiver unit 110 receives the second GNSS signal from the same satellite 201 when the receiver unit 110 is turned off and then after an elapsed period turned back on. In addition, after the receiver unit 110 further receives another one or more first GNSS signals from another one or more satellites, when the receiver unit 110 is turned off and then turned on for receiving corresponding another one or more second GNSS signals, the error correction unit 170 gets corresponding another one or more estimated clock offsets. For utilizing these estimated clock offsets, the apparatus 100 includes an average unit 190 and an analyzing unit 195.

In use, the average unit 190 can average all of the estimated clock offsets to obtain an average estimated clock offset, so as to reduce an error of the clock-offset estimation. Alternatively or additionally, the analyzing unit 195 can analyze variance in all of the estimated clock offsets for computing accuracy of the clock-offset estimation.

Moreover, the tracking unit 130 can process the first GNSS signal to further obtain a first time of week and a first week number, the storage unit 160 can store the first time of week and the first week number. After the receiver unit 110 is turned off and then turned on, the tracking unit 130 can perform a frame synchronization on the second GNSS signal to estimate a second week number based on the first time of week. In this way, even if the apparatus 100 had no battery for the local clock (i.e., real time clock), the tracking unit 130 would estimate the second week number, so that the satellite-positioning unit 140 can shorten time to first fix (TTFF).

For verifying the second week number, the average unit 190 can average all of the estimated clock offsets to get a mean value, the analyzing unit 195 can analyze variance in all of the estimated clock offsets to get a variance value, and the tracking unit 130 retains the second week number when the mean value is less than a predetermined mean threshold and the variance value is less than a predetermined variance threshold. On the contrary, the tracking unit 130 bypasses the second week number when the mean value is greater than a predetermined mean threshold and the variance value is greater than a predetermined variance threshold. The predetermined mean threshold value is any suitable value, and the predetermined variance threshold is any suitable value. For example, the predetermined mean and/or variance thresholds may be based on various experiment parameters.

In the apparatus 100, the receiver unit 110, the Doppler correction unit 120, the tracking unit 130, the satellite-positioning unit 140, the computation unit 150, the storage unit 160, the error correction unit 170, the parameter adjustment unit 180, the average unit 190, and the analyzing unit 195 may be hardware, software, and/or firmware. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

Moreover, in one or more embodiments, any one of above-mentioned units may be divided into various sub-units, or one of abovementioned units may be integrated into another. Those with ordinary skill in the art may design these units depending on the desired application.

Figure 2:
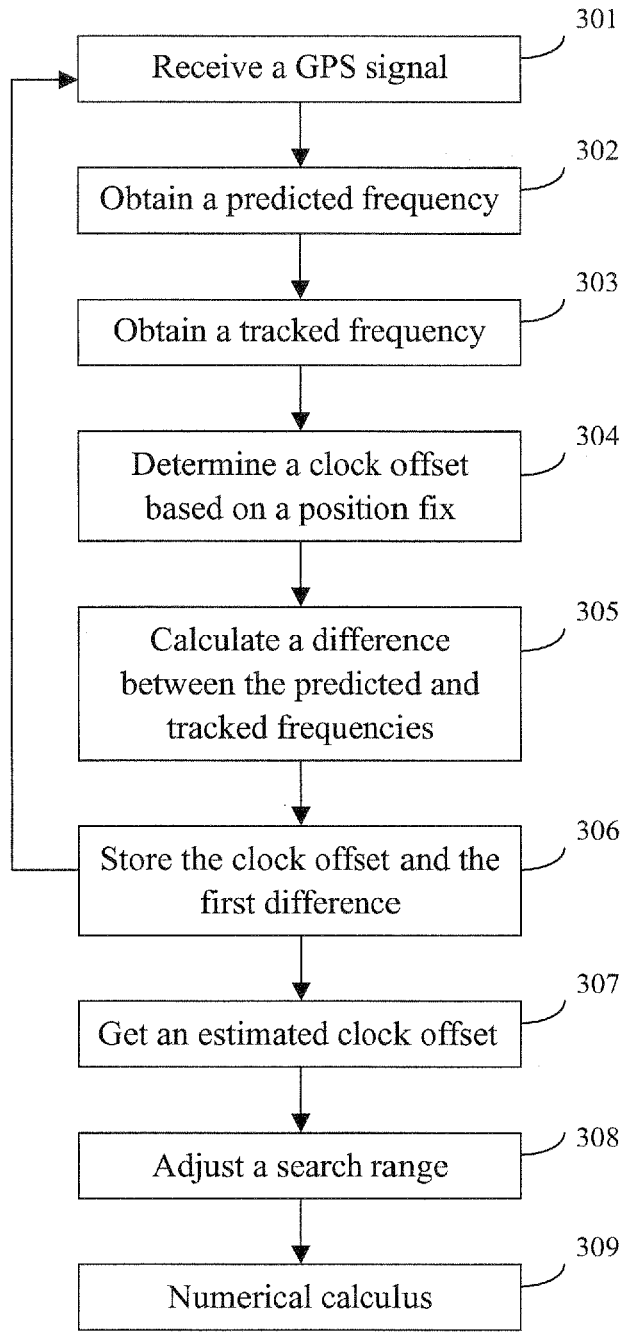
FIG. 2 is a flowchart of a method of correcting a clock drift error according to one embodiment of the present disclosure.

FIG. 2 is a flowchart of a method 300 of correcting a clock drift error according to one embodiment of the present disclosure. As shown in FIG. 2, the method 300 includes steps 301-309 as follows (The steps are not recited in the sequence in which the steps are performed. That is, unless the sequence of the steps is expressly indicated, the sequence of the steps is interchangeable, and all or part of the steps may be simultaneously, partially simultaneously, or sequentially performed). It should be noted that those implements to perform the steps in the method 300 are disclosed in above embodiments and, thus, are not repeated herein.

A first GNSS signal is received from a satellite by using a receiver unit in step 301. A first predicted frequency is obtained in step 302 by performing Doppler correction to the first GNSS signal based on Doppler information derived from the first GNSS signal. The first GNSS signal is processed in step 303 to obtain a first tracked frequency of the satellite. A position fix is performed in step 304 and a clock offset based on the position fix is also determined in step 304. A first difference between the first predicted frequency and the first tracked frequency is calculated in step 305. The clock offset and the first difference are stored in step 306. When the receiver unit is turned off and then turned on for receiving a second GNSS signal from the satellite, step 302 is performed anew to obtain a second predicted frequency, step 303 is performed anew to obtain a second tracked frequency of the first satellite, step 304 is performed anew to calculate a second difference between the second predicted frequency and the second tracked frequency. Then, an estimated clock offset is computed in step 307 according to the clock offset, the first difference, and the second difference. Specifically, in a preferable embodiment, the first difference is subtracted from the second difference to obtain a third difference, and the third difference and the clock offset are added together to get an estimated clock offset in step 307.

Accordingly, the method 300 can be performed to calculate the estimated clock offset beforehand by only one satellite, without utilizing any temperature sensor for temperature compensation on the stored clock offset. In operation, step 307 is performed to get the estimated clock offset before the step 304 is performed again without utilizing any additional hardware for compensation on the clock offset stored in the storage unit. The estimated clock offset may be more or less the same as a real clock offset that is determined in step 304. In practice, if the receiver unit were not moved, the estimated clock offset would be substantially equal to the real clock offset. Thus, the clock drift error can be corrected quickly by performing the method 300.

For reducing search time for a weak GNSS signal, a search range of the receiver unit can be adjusted in step 308 according to the estimated clock offset. The signal strength of the weak GNSS signal ranges form about −160 dBm to −145 dBm; the signal strength of a normal GNSS signal is about −130 dBm.

For a more complete understanding of the position fix, please refer to the following examples. When the receiver unit not only receives the first GNSS signal from the satellite but also receives another three first GNSS signals respectively from another three satellites, the step 303 is performed to further process these three first GNSS signal, so that step 304 performs the position fix based on the four processed first GNSS signals corresponding to the four satellites.

In above embodiment, the receiver unit receives the first GNSS signal from one satellite first, and then the receiver unit receives the second GNSS signal from the same satellite when the receiver unit is turned off and then after an elapsed period turned back on. In addition, after the receiver unit further receives another one or more first GNSS signals from another one or more satellites, the receiver unit is turned off and then turned on for receiving corresponding another one or more second GNSS signals in step 301, so that the step 307 is performed to get corresponding another one or more estimated clock offsets. For utilizing these estimated clock offsets, all of the estimated clock offsets are averaged in step 309 to obtain an average estimated clock offset, so as to reduce an error of the clock-offset estimation. Alternatively or additionally, variance in all of the estimated clock offsets is analyzed in step 309 for computing accuracy of the clock-offset estimation.

Moreover, the step 303 is performed to process the first GNSS signal to further obtain a first time of week and a first week number, the step 306 is performed to store the first time of week and the first week number, and after the receiver unit is turned off and then turned on, the step 303 is performed anew to perform a frame synchronization on the second GNSS signal to estimate a second week number based on the first time of week. In this way, even if there is no battery for the local clock (i.e. real time clock), the step 303 would estimate the second week number, so that time to first fix (TTFF) can be shortened during the step 304.

For verifying the second week number, all of the estimated clock offsets all of the estimated clock offsets are averaged in step 309 to get a mean value, variance in all of the estimated clock offsets is analyzed in step 309 to get a variance value, and the step 303 is to retain the second week number when the mean value is less than a predetermined mean threshold and the variance value is less than a predetermined variance threshold. On the contrary, the step 303 is to bypass the second week number when the mean value is greater than a predetermined mean threshold and the variance value is greater than a predetermined variance threshold.

The method 300 may take the form of a computer program product on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

The invention claimed is:

1. An apparatus for correcting a clock drift error, the apparatus comprising:
   a receiver unit for receiving a first GNSS signal from a satellite;
   a Doppler correction unit for obtaining a first predicted frequency by performing Doppler correction to the first GNSS signal based on Doppler information derived from the first GNSS signal;
   a tracking unit for processing the first GNSS signal to obtain a first tracked frequency of the satellite;
   a satellite-positioning unit for performing a position fix and determining a clock offset based on the position fix;
   a computation unit for calculating a first difference between the first predicted frequency and the first tracked frequency;
   a storage unit for storing the clock offset with the first difference, wherein when the receiver unit is turned off and then turned on for receiving a second GNSS signal from the satellite, the Doppler correction unit obtains a second predicted frequency, the tracking unit obtains a second tracked frequency of the satellite, and the computation unit calculates a second difference between the second predicted frequency and the second tracked frequency; and
   an error correction unit for computing an estimated clock offset according to the clock offset, the first difference, and the second difference.

2. The apparatus of claim 1, wherein the error correction unit gets the estimated clock offset before the satellite-positioning unit performs the position fix again.

3. The apparatus of claim 2, further comprising:
   a parameter adjustment unit for adjusting a search range of the receiver unit according to the estimated clock offset.

4. The apparatus of claim 1, wherein when the receiver unit further receives another three first GNSS signals respectively from another three satellites, the tracking unit further processes the three first GNSS signal, so that the satellite-positioning unit performs the position fix based on the four processed first GNSS signals.

5. The apparatus of claim 1, wherein after the receiver unit further receives another one or more first GNSS signals from another one or more satellites, when the receiver unit is turned off and then turned on for receiving corresponding another one or more second GNSS signals, the error correction unit gets corresponding another one or more estimated clock offsets.

6. The apparatus of claim 5, further comprising:
an average unit for averaging all of the estimated clock offsets.

7. The apparatus of claim 5, further comprising:
an analyzing unit for analyzing variance in all of the estimated clock offsets.

8. The apparatus of claim 5, wherein the tracking unit processes the first GNSS signal to further obtain a first time of week and a first week number, the storage unit stores the first time of week and the first week number, and after the receiver unit is turned off and then turned on, the tracking unit performs a frame synchronization on the second GNSS signal to estimate a second week number based on the first time of week.

9. The apparatus of claim 8, further comprising:
an average unit for averaging all of the estimated clock offsets to get a mean value; and
an analyzing unit for analyzing variance in all of the estimated clock offsets to get a variance value,
wherein the tracking unit retains the second week number when the mean value is less than a predetermined mean threshold and the variance value is less than a predetermined variance threshold.

10. The apparatus of claim 9, wherein the tracking unit bypasses the second week number when the mean value is greater than a predetermined mean threshold and the variance value is greater than a predetermined variance threshold.

11. A method of correcting a clock drift error, the method comprising:
(a) receiving a first GNSS signal from a satellite by using a receiver unit;
(b) obtaining a first predicted frequency by performing Doppler correction to the first GNSS signal based on Doppler information derived from the first GNSS signal;
(c) processing the first GNSS signal to obtain a first tracked frequency of the satellite;
(d) performing a position fix and determining a clock offset based on the position fix;
(e) calculating a first difference between the first predicted frequency and the first tracked frequency;
(f) storing the clock offset with the first difference, wherein when the receiver unit is turned off and then turned on for receiving a second GNSS signal from the satellite, the step (b) is performed anew to obtain a second predicted frequency, the step (c) is performed anew to obtain a second tracked frequency of the first satellite, and step (d) is performed anew to calculate a second difference between the second predicted frequency and the second tracked frequency; and
(g) computing an estimated clock offset according to the clock offset, the first difference, and the second difference.

12. The method of claim 11, wherein the step (g) is performed to get the estimated clock offset before the step (d) is performed again.

13. The method of claim 11, further comprising:
adjusting a search range of the receiver unit according to the estimated clock offset.

14. The method of claim 11, wherein when the receiver unit further receives another three first GNSS signals respectively from another three satellites, the step (c) is performed to further process the three first GNSS signal, so that the step (d) performs the position fix based on the four processed first GNSS signals.

15. The method of claim 11, wherein after the receiver unit further receives another one or more first GNSS signals from another one or more satellites, when the receiver unit is turned off and then turned on for receiving corresponding another one or more second GNSS signals, the step (g) is performed to get corresponding another one or more estimated clock offsets.

16. The method of claim 15, further comprising:
averaging all of the estimated clock offsets.

17. The method of claim 15, further comprising:
analyzing variance in all of the estimated clock offsets.

18. The method of claim 5, wherein the step (c) is performed to process the first GNSS signal to further obtain a first time of week and a first week number, the step (f) is performed to store the first time of week and the first week number, and after the receiver unit is turned off and then turned on, the step (c) is performed anew to perform a frame synchronization on the second GNSS signal to estimate a second week number based on the first time of week.

19. The method of claim 18, further comprising:
averaging all of the estimated clock offsets to get a mean value;
analyzing variance in all of the estimated clock offsets to get a variance value; and
retaining the second week number when the mean value is less than a predetermined mean threshold and the variance value is less than a predetermined variance threshold.

20. The method of claim 19, further comprising:
bypassing the second week number when the mean value is greater than a predetermined mean threshold and the variance value is greater than a predetermined variance threshold.

* * * * *